Dec. 14, 1954

P. L. HANCOCK 2,697,220

SIDEBAND GENERATOR

Filed May 6, 1953

INVENTOR
PETER L. HANCOCK
BY
Ernest Fanwick
ATTORNEY 2,697,220

Patented Dec. 14, 1954

2,697,220

SIDEBAND GENERATOR

Peter L. Hancock, Rochelle Park, N. J., assignor to International Telephone and Telegraph Corporation, a corporation of Maryland Application May 6, 1953, Serial No. 353,419

7 Claims. (Cl. 343—107)

This invention relates to sideband generators and more particularly to mechanically driven sideband generators.

In general, sideband generators are intended to provide the necessary radio frequency signals for either the course or path facilities of an instrument landing system. Heretofore, reactance type sideband modulators have been used which caused the load impedance to the radio frequency generator to vary. Since the radio frequency generator had to be designed to function with a varying load impedance it could not be operated at a high order of efficiency. When two sideband frequencies had to be generated, as is required for most instrument landing systems, an isolation network between the sideband frequency generators had to be provided to minimize the excessive cross modulation and even with such networks there always remained a residual amount of cross modulation. Other difficulties have arisen in the design of such instrument landing systems such as the undesirable phase modulation of the resultant amplitude modulating carrier or the existence of standing waves on the transmission lines carrying radio frequency power which caused an increased stability requirement on the generator.

One of the objects of this invention, therefore, is to provide a sideband frequency generator system which offers a substantially constant load impedance to the radio frequency generator.

Another object of this invention is to provide a sideband frequency generator system to generate a plurality of sideband signals of different frequencies without the occurrence of cross modulation or the necessity of an adjustment in an isolation network to minimize such cross modulation.

A further object of this invention is to provide a sideband generator system having a greater stability in the modulated waveform through the independence of the modulator parameters on the source of impedance.

A feature of this invention is the use of a radio frequency generator whose output energy is coupled to two identical phasing section bridge networks each having equal distances between their junctions with 180° added to one leg of each bridge. Motor driven balanced capacitors are provided to vary the admittances terminating the side arms of the phasing section bridge networks in a reciprocal manner to cause the output energy to be a sinusoidally varying sideband modulated radio frequency signal which is coupled to the input legs of a phase discriminating bridge network where the radio frequency carrier energy is canceled coupling pure sideband energy to two equal loads of equal impedance.

The above-mentioned and other features and objects of this invention will become more apparent by reference to the following description taken in conjunction with the accompanying drawings, in which.

Figures 1, 2, 3:
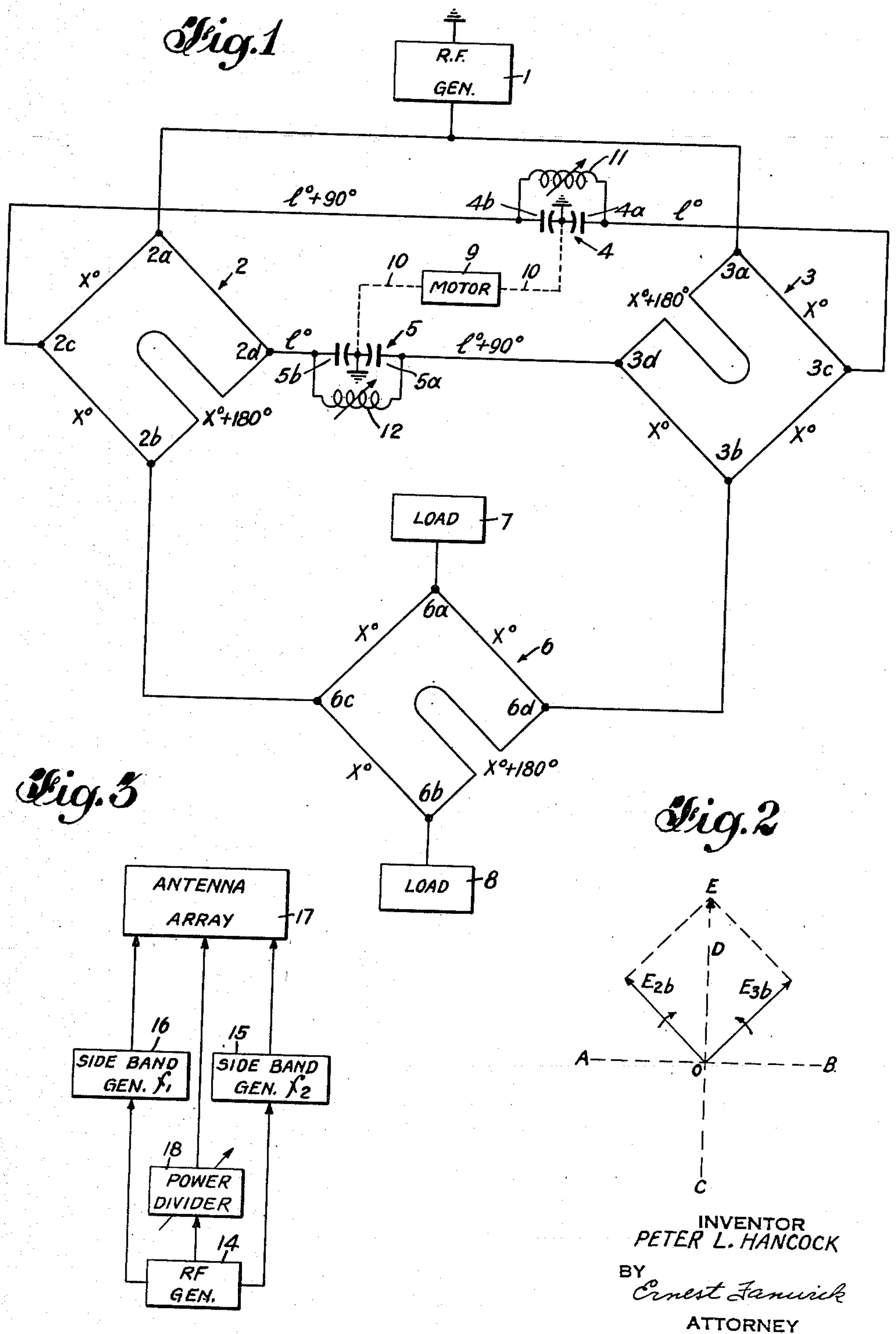
Fig. 1 is a schematic illustration in block form of one embodiment of the sideband generator of this invention.
Fig. 2 is a vector diagram used in explaining the operation of the sideband generator system of Fig. 1.
Fig. 3 is a block diagram of an instrument landing system using the sideband generator of this invention.

Referring to Fig. 1 a sideband generator in accordance with the principles of this invention is shown comprising a radio frequency generator 1 coupled to the input junctions of two identical phasing section bridge networks 2 and 3. The side arms of the phasing section bridge networks 2 and 3 are coupled together through two motor driven balanced capacitors 4 and 5. The sinusoidally varying sideband modulated radio frequency signals from the output terminal of each of the bridge networks 2 and 3 are coupled to the side arms of a phase discriminating bridge 6 whose output is coupled to two loads 7 and 8 of equal impedance.

Each phasing section bridge network 2 and 3 is so constructed that there is equal electrical lengths X degrees between each of its junctions with an additional distance equal to 180° in electrical length added to one arm in each bridge to provide the equivalent of the usual transition. The radio frequency energy from generator 1 is coupled to the input terminals *2a* and *3a* of bridges 2 and 3 respectively. The transfer of energy between the opposite junctions *2a*, *2b* and *3a*, *3b* of bridges 2 and 3 respectively is proportional to the difference of the admittances terminating the side arm junctions *2c*, *2d* and *3c*, *3d*. When the admittances are susceptances only, that is, when their reflection coefficients are equal to unity and of such an angle that at their respective junctions the vector sum is equal to zero, the transfer of energy between the input terminals *2a* and *3a* and the output terminals *2b* and *3b* is complete. The phase of the resulting voltage output $E_{2b}$ and $E_{3b}$ at the load junctions *2b* and *3b* with respect to the input voltages $E_{2a}$ and $E_{3a}$ at junctions *2a* and *3a* is at any instant of a modulating cycle the angle determined by the vector sum of voltages coupled to junctions *2b* and *3b* from the side arm junctions *2c*, *2d*, and *3c*, *3d*. In order to vary the admittances terminating the side arm junctions of bridges 2 and 3, to vary the transfer of energy between the input and output terminals, corresponding side arm junctions *2c*, *3c*, and *2d*, *3d* of the phasing section bridge networks 2 and 3 are coupled together. Balanced capacitor 4 having two capacitor sections *4a* and *4b* is coupled between the side arm junctions *2c* and *3c*. The electrical length from terminal *2c* to capacitor section *4b* is 90° greater than the electrial length between the terminal *3c* and capacitor section *4a*. In a similar manner balanced capacitor 5 having two capacitor sections *5a* and *5b* is coupled between side arm junctions *2d* and *3d*, the electrical length from terminal *3d* to capacitor section *5a* being 90° greater than the length between terminal *2d* and capacitor section *5b*. The balanced capacitors 4 and 5 are driven by a motor 9 through mechanical linkage 10. The motor driven balanced capacitors provide the correct shunting susceptances at the side arm junctions of each of the phasing section bridge networks 2 and 3 while the correct sign for the susceptances is provided by the 90° difference in the electrical distance from the side arm junctions of each bridge network to the capacitor sections.

Each capacitor section of balanced capacitors 4 and 5 may have a multi-bladed rotor. The desired modulating frequency is then determined by the number of rotor blades times the speed of the motor in seconds. Due to the location of motor driven balanced capacitors 4 and 5 the admittances terminating the diagonally opposite side arm junctions of each bridge 2 and 3 varies reciprocally in a sinusoidal manner. It is well-known to those skilled in the art from the known relation of power transfer through a hybrid ring or bridge network that the impedance represented by each of the phasing section bridge networks 2 and 3 is constant for a unity reflection coefficient at the two side arm junctions *2c*, *2d* and *3c*, *3d* with the vector sum at the output terminals *2b* and *3b* equal to the generator voltage if the susceptances are equal and of conjugate phase. Hence the total input impedance to generator 1 remains a constant.

Of course it will be understood that the motor driven balanced capacitors used to vary the admittances terminating the side arm junctions of each bridge may be replaced by any equivalent circuit element such as balanced reactance tubes.

By the proper choice of line length 1° between the capacitors 4 and 5 and the bridge networks 2 and 3, and of the characteristic impedance of the side arms to the capacitors 4 and 5, and in the value of the minimum capacity of each section of balanced capacitors 4 and 5, a practical capacitor with a practical incremental capacity may be obtained. In order to insure the production of the required incremental impedance at the capacitors 4 and 5 shunting inductances 11 and 12 are provided which permits a practical and simple means for adjusting the resultant incremental impedance over a band of operating frequencies.

The voltage output from each of the bridge networks 2 and 3 is a sinusoidal function such that the output from terminal 2d equals $$E_{2d}=E_{2a}\sin(\omega+p)t$$

the output from terminal 3d is $$E_{3d}=E_{3a}\sin(\omega-p)t$$

where $\omega=2\pi\times$input frequency and $p=2\pi\times$modulating frequency. The two sinusoidal varying amplitude modulated radio frequency voltages are coupled to terminals 6c and 6d of phase discriminating bridge network 6. Bridge network 6 is similar in construction to networks 2 and 3, that is, there is equal distance between each of its junctions with an extra 180° in electrical distance added to one arm. In accordance with well-known bridge network theory the radio frequency carrier energy cancels and pure sideband energy is coupled from the output terminals 6a and 6b to loads 7 and 8.

Referring to the vector diagram of Fig. 2, if for an instantaneous value in phase difference between $E_{2d}$ and $E_{3d}$, the two input voltages are in phase as shown by vectors $\overrightarrow{AO}$ and $\overrightarrow{OB}$, the voltage output from terminal 6b of bridge network 6 will be zero since the input voltages cancel due to the transition arm between terminals 6d and 6b being 180° greater in length than the bridge arm between terminals 6c and 6b. However, under the same conditions of input phase relation the voltage output from terminal 6a will be equal to the sum of the vectors $\overrightarrow{AO}$ and $\overrightarrow{OB}$ since the input voltages $E_{2d}$ and $E_{3d}$ is made to advance 90° in phase as represented by vector $\overrightarrow{OD}$ and input voltage $E_{3d}$ is retarded by 90° in phase, as represented by vector $\overrightarrow{OC}$ the resultant voltage output from terminal 6b is the sum of the input voltages $E_{2d}$ and $E_{3d}$ due to the transition arm of network 6 while the resultant voltage output from terminal 6a becomes zero since the two input voltages cancel. If we assume that the input voltage $E_{2d}$ is retarded 90° in phase from its position $\overrightarrow{AO}$ the vector may be represented by $\overrightarrow{OC}$ and if the phase of the input voltage $E_{3d}$ is advanced by 90° it is represented by vector $\overrightarrow{OD}$ and the resultant voltage at output terminal 6b is again equal to the sum of the input voltages, but it is now 180° out of phase with respect to the condition described above. For any phase change intermediate of the conditions described, the voltage output from terminal 6b is equal to the vectorial difference of the input voltages $E_{2d}$ and $E_{3d}$ and the output voltage from terminal 6a is equal to the vectorial addition of the input voltages $E_{2d}$ and $E_{3d}$. Obviously if the velocity and the change in phase of the two input voltages $E_{2d}$ and $E_{3d}$ is constant, their respective phases can be represented by two contra-rotating vectors as shown by vectors $E_{2d}$ and $E_{3d}$, then sinusoidal varying sideband signals are coupled from output terminals 6a and 6b to loads 7 and 8.

Referring to Fig. 3 of the drawing a schematic illustration in block form of an instrument landing transmission system is shown wherein the generation of two sideband signals of different frequency is accomplished without the occurrence of cross modulation or the necessity of an adjustment and isolation network to minimize cross modulation. A radio frequency generator 14 supplies carrier frequency energy to two sideband generator circuits 15 and 16. Each sideband generator circuit 15 and 16 is similar to the circuit shown in Fig. 1; however, the modulation frequency in each circuit is different, for example, one sideband generator 15 generates 90 cycles per second while the other sideband generator 16 generates 150 cycles per second. The output of each sideband generator is coupled to the instrument landing system antenna array 17. The output of generator 14 is coupled through power divider 18 to the antenna array 17 to provide carrier frequency energy. Power divider 18 provides an adjustment for the percentage modulation which can, if necessary, also be fixed at the designed center value by the power division between the carrier and sideband signals. Since in all transmission lines carrying radio frequency energy no standing waves exist, spurious radiation is minimized and the efficiency of the instrument landing system is increased.

While I have described above the principles of my invention in connection with specific apparatus, it is to be clearly understood that this description is made only by way of example and not as a limitation to the scope of my invention as set forth in the objects thereof and in the accompanying claims.

I claim:

1. A sideband frequency generator comprising a first and second bridge network each having one leg thereof arranged to include an equivalent of a one-half wavelength greater length as compared to the length of each of the other three legs, means to vary in a sinusoidal and complementary manner the admittances terminating two diagonally opposite junctions of each bridge, a source of radio frequency energy, means to apply said radio frequency energy to one other junction of each bridge, a third bridge having one leg thereof arranged to include an equivalent of a one-half wavelength greater length as compared to the length of each of the other three legs, means to couple the two diagonally opposite junctions of said third bridge to the output from the junction opposite said other junctions in each of said first and second bridges and means for connecting two loads to the other two diagonal junctions of said third bridge.

2. A sideband frequency generator according to claim 1 wherein said admittances terminating the diagonally opposite junctions of each of said first and second bridges are pure susceptances having a reflection coefficient equal to unity and of such an angle that at their respective junctions the vector sum is zero.

3. A sideband frequency generator according to claim 1 wherein said means to vary in a sinusoidal and complementary manner the admittances terminating two diagonally opposite junctions of each of said first and second bridges includes a motor, a first and second variable balanced capacitor driven by said motor, each capacitor having a first and second capacitive section, a first pair of circuit means coupling the first section of said first and second balanced capacitors respectively to diagonally opposite junctions of said first bridge, a second pair of circuit means coupling the second section of said first and second balanced capacitors respectively to diagonally opposite junctions of said second bridge, said first and second circuit means being arranged to include in one circuit of each of said pair the equivalent of a quarter wavelength greater length than the length of the other circuit thereof.

4. A sideband frequency generator according to claim 3 which further includes a variable shunting inductance connected in parallel across each of said motor driven balanced capacitors.

5. A sideband frequency generator comprising a first and second bridge network each having one leg thereof arranged to include an equivalent of a one-half wavelength greater length as compared to the length of each of the other three legs, means to vary in a sinusoidal and complementary manner the admittances which have a reflection coefficient equal to unity terminating two diagonally opposite junctions of each of said first and second bridges including a motor, a first and second variable balanced capacitor driven by said motor, each capacitor having a first and second capacitive section, a first pair of circuit means coupling the first section of said first and second balanced capacitors respectively to diagonally opposite junctions of said first bridge, a second pair of circuit means coupling the second section of said first and second balanced capacitors respectively to diagonally opposite junctions of said second bridge, said first and second circuit means being arranged to include in one circuit of each of said pair the equivalent of a quarter wavelength greater length than the length of the other circuit thereof, a source of radio frequency energy, means to apply said radio frequency energy to one other junction of each bridge, a third bridge having one leg thereof arranged to include an equivalent of a one-half wavelength greater length as compared to the length of each of the other three legs, means to couple the two diagonally opposite junctions of said third bridge to the output from the junction opposite said other junctions in each of said first and second bridges and means for connecting two loads to the other two diagonal junctions of said third bridge.

6. An instrument landing system comprising a source of radio frequency energy, means to couple a first and second sideband generator to said source of energy, each of said generators including a first and second bridge network each having one leg thereof arranged to include an equivalent of a one-half wavelength greater length as compared to the length of each of the other three legs, means to vary in a sinusoidal and complementary manner the admittances terminating two diagonally opposite junctions of each of said first and second bridges, means to apply said radio frequency energy to one other junction of each of said first and second bridges, a third bridge having one leg thereof arranged to include an equivalent of a one-half wavelength greater length as compared to the length of each of the other three legs, means to couple the two diagonally opposite junctions of said third bridge to the output from the junction opposite said other junctions in each of said first and second bridges, an antenna system, means for coupling the outputs of the third bridge of each of said generators to said antenna system and means for coupling said source of radio frequency energy to said antenna system.

7. A system according to claim 6 wherein said means for coupling said source of radio frequency energy to said antenna array further includes means to control the amount of energy coupled from said source of energy to said antenna array.

References Cited in the file of this patent

UNITED STATES PATENTS

| Number | Name | Date |
|---|---|---|
| 2,414,431 | Alford et al. | Jan. 21, 1947 |
| 2,429,634 | Lundberg | Oct. 28, 1947 |